Patented Aug. 23, 1932

1,873,542

UNITED STATES PATENT OFFICE

HUGH MILLS BUNBURY, OF MANCHESTER, ENGLAND, ASSIGNOR TO IMPERIAL CHEMICAL INDUSTRIES LIMITED, OF WESTMINSTER, ENGLAND

PROCESS OF PRODUCING THERMOPLASTIC PRODUCTS

No Drawing. Application filed August 2, 1930, Serial No. 472,745, and in Great Britain August 8, 1929.

This invention relates to the conversion of fatty oils which are derivatives wholly or in part of unsaturated acids into thermoplastic products capable of vulcanization and then valuable as rubber substitutes, some of which are also valuable for the manufacture of varnishes and lacquers.

My invention comprises a treatment of such fatty oils with gases at raised temperatures and preferably at considerably reduced pressures, by which means the unsaturated esters in the oils are polymerized to a suitable degree. My invention further comprises the conversion of the polymerized oils, which have an increased viscosity compared with the starting materials but which are still more or less fluid, into thermoplastic products by dissolving therein a suitable quantity of a salt of a high fatty acid, preferably, but not necessarily of a saturated acid. The soap may be added after or at any stage of the polymerization treatment.

The term "soap" as used in this specification is not limited to alkali salts, but includes other salts of the higher fatty acids.

My invention further comprises the vulcanization of the thermoplastic products by any of the methods which have been applied to rubber, with or without the use of activators or accelerators, and with or without the addition of pigments, fillers, etc.

The products obtained according to my invention may also be compounded with solvents, with or without the addition of cellulose esters or other varnish bases, pigments, plasticizers, etc., for the production of varnishes or lacquers.

It is well-known in the art that elastic masses may be made by heating linseed oil in a stream of inert or oxidizing gas. Wood oil and linseed oil have been polymerized by heating in a current of carbon dioxide, nitrogen or hydrogen. Where solid products have hitherto been obtained, however, these have been liquefied with difficulty, if at all, and their hot vulvanization has thus presented very great practical difficulties.

As suitable starting materials we may use any unsaturated fatty oils, e. g., such as are generally classed as drying or semi-drying oils (see, for example, Holde, Kohlenwasserstoffole and Fette, 6th Ed., p. 602, 604) and these include, for instance, linseed oil, tung oil, cottonseed oil and the like, or I may use unsaturated animal oils such as whale oil, herring oil (Holde, loc. cit., 608, 610). Mixtures of oils may also be used. The oils may contain saturated fatty oils or other diluents, but it will be understood that only the unsaturated oils capable of polymerization play an essential role in the reaction.

For the gas treatment I may use such inert gases as sulfuretted hydrogen, sulfur dioxide, nitrogen, hydrogen (in the absence of hydrogenating catalysts), and carbon dioxide. I exclude so far as is practicable all air of oxygen or other oxidizing gases, since these produce entirely different and less useful results. I find that the action of the different gases varies somewhat, and we may vary the nature of the final product to an appreciable extent by taking advantage of this. Mixtures of gases may be employed.

I prefer to work under reduced pressure, e. g. at 15 to 125 mm. of mercury, since polymerization is usually more rapid under such conditions. Higher pressures or lower pressures than these may, however, be employed. One advantage of working at reduced pressure, apart from speed of reaction, is that gases normally soluble in the oils are removed therefrom. The gases do not appear to react chemically with the oils, but merely act as polymerization catalysts; they may be recovered from the exit tubes and used over and over again if desired.

The temperatures contemplated in our invention are such as facilitate polymerization and are usually above 200° C.

The gas- and heat-treatments are continued until a degree of viscosity is reached which previous trial experiments have shown to be suitable for the production, in the subsequent soap-treatment, of the desired thermoplastic product. The viscosity increases as polymerization proceeds, and can therefore easily be followed by determinations of the iodine number of the oil at successive stages. Usually I find it desirable to allow the heat- and gas-treatment to continue until the iodine number has fallen to about 50–70% of its original value.

In the examples described hereunder I indicate the degree to which I prefer to continue the polymerization in particular cases, but it will be understood that my invention is not limited to these, and a considerable variation, within desirable limits, in the properties of the thermoplastic product may be brought about by varying the degree of polymerization in the first stage of my process. The lower limit is conditioned by the inability of the unpolymerized oil to produce the desired thermoplastic mass when treated with the soap. The upper limit is conditioned by the necessity for obtaining in the first stage a stirable liquid mass which can be treated with the soap. The smaller the proportion of polymerized oil the less "solid" and more "sticky" will be the product. To obtain the hardest varieties of thermoplastic product the polymerization must be continued so long as the oil remains a stirable liquid capable of dissolving the soap.

The application of the above principles to that modification of my invention in which the soap is present from the beginning is obvious. The necessary fall in the iodine number may be first determined from trials in which the soap is added after polymerization. The process may then be performed in the presence of the soap until the desired fall in iodine number is reached (allowance being made for the iodine value of the added soap, if necessary).

The soaps I use are, as stated above, salts of higher fatty acids, saturated or unsaturated. Variations in hardness, tensile strength, etc., of the products may be produced not only by varying the conditions of the polymerization process (e. g., temperature, pressure, nature of gas used, duration of treatment, presence or absence of unpolymerizable oils and other diluents, use of mixtures of polymerizable oils), but also by varying the nature and the amount of soap employed. I prefer for most purposes, e. g., the manufacture of rubber substitutes or bases for varnishes giving hard films, to use a hard soap, e. g., sodium stearate, palmitate, etc. The amount of soap employed may be varied within wide limits; 5% of the weight of oil is often sufficient, but 10% or more may be used.

For the vulcanization of the products obtained according to my invention the solid or semi-solid mass may be treated with sulfur chloride in the cold, but we prefer to take advantage of their thermoplastic nature and melt them with sulfur in the manner employed for the hot vulcanization of rubber; activators, accelerators, fillers, pigments, etc., being added as desired.

My products find application in the rubber and linoleum industries as rubber substitutes, and as varnish or lacquer bases.

My invention is illustrated but not limited by the following examples in which the parts are by weight.

*Example 1*

500 parts of linseed oil are heated at 290–300° for five hours during which a slow stream of sulfur dioxide is passed through the oil. The vessel in which the heating is carried out is connected to a vacuum pump and a vacuum of about 28 inches of mercury is maintained during the process. During the preliminary heating up of the oil the latter darkens slightly in color, but this soon disappears and the oil finally possesses a color lighter than that of the original and is also clearer. In starting the process, a good vacuum is first obtained. The sulfur dioxide is then passed into the oil and heating commenced, so that at no period is the hot oil subjected to the action of air or oxygen. At the end of the heating period the oil is cooled to about 150° while still in the atmosphere of the gas. Below this temperature the oil may be exposed to the air without detriment. When cold the product is a thick oil of much greater viscosity than the raw linseed oil started with. The final product is found to contain no absorbed gas, and the oil suffers little or no loss in weight as a result of the process. The iodine value of the oil falls from 180 to about 100–110 and there is a slight increase in the acid value.

If instead of heating for 5 hours we employ 3 hours, the product is less viscous and has an iodine value of 125. If the process is continued for 7 hours a very viscous product is obtained having an iodine value of about 90–95.

If lower temperatures are employed, the process must be continued for a correspondingly longer time in order to obtain the same degree of unsaturation, and the time may be curtailed by employing higher temperatures, e. g., 320–330° C.

Although not absolutely essential, it is desirable that no oxygen be allowed to enter the apparatus until the process has been completed and the oil cooled to at least 150° C.

*Example 2*

Linseed oil is treated in a manner similar to that described in Example 1 except that hydrogen sulfide is employed in place of sulfur dioxide. The product in this case is slightly darker in color than the original oil and contains no absorbed gas. It is much more viscous than the starting material and the reduction in the degree of unsaturation is represented by a drop in the iodine value from 180 to 105–110.

*Example 3*

Carbon dioxide is used in place of the sulfur dioxide in Example 1. The iodine value drops from 180–120.

Example 4

Herring oil is treated in a similar manner to that described in Example 1, i. e., using SO₂ and a temperature of 250–60°. After 5 hours a very viscous oil is obtained with very little change in color. The iodine value drops from 145 to 85.

Example 5

Crude soya bean oil is treated with SO₂ as in Example 1. Color is rather darker than the original. The iodine value drops from 134 to 99.

Example 6

To 200 parts of polymerized linseed oil obtained as in Example 1 are added 20 parts of dry sodium stearate. The mixture is heated under vacuum with agitation to a temperature of 240–60° over about ½ to ¾ hour. The mass is then a clear and homogeneous liquid. It is allowed to cool to 180° out of contact with air, and may be then discharged from the vessel. When cold, the product is a light colored, semi-transparent gel, which softens on heating and becomes semi-liquid at about 110–120°.

Example 7

If, in Example 6, magnesium stearate is employed instead of the sodium salt, a light brown transparent gel is obtained.

Example 8

By employing 1% of sodium dioxystearate in a polymerized linseed oil obtained as in Example 1, a very light colored, transparent, soft gel results.

Example 9

For the vulcanization of the product obtained according to Example 6 by the gelation of linseed oil which has been polymerized by the process described in Example 1, 40 parts of the material are melted and stirred at about 120° C. To the liquid 0.7 parts of zinc oxide and the accelerator (e. g., 0.56 parts of mercaptobenzthinazole), and 5 parts of melted sulfur are added with stirring, and stirring is continued at 120–130° for about 3 hours until vulcanization is complete. The melt is then poured out and allowed to solidify.

There is thus obtained a tough product having a good tensile strength and suitable for use as a rubber substitute.

As many apparent and widely different embodiments of this invention may be made without departing from the spirit thereof, it is to be understood that I do not limit myself to the foregoing examples or description except as indicated in the following claims.

I claim:

1. A process of making thermoplastic materials which comprises polymerizing unsaturated fatty oils by heating said oils, simultaneously passing a current of a non-oxidizing gas through the heated oils and subsequently heating the gas-treated oil in the presence of a salt of a fatty acid.

2. A process of making thermoplastic materials which comprises polymerizing unsaturated fatty oils by heating said oils at temperatures of not less than 200° C., simultaneously passing a current of a non-oxidizing gas through the heated oils and subsequently heating the gas-treated oil in the presence of a salt of a fatty acid.

3. A process of making thermoplastic materials which comprises polymerizing unsaturated fatty oils by heating said oils under sub-atmospheric pressure and in the presence of a non-oxidizing gas and subsequently heating the gas-treated oil in the presence of a salt of a fatty acid.

4. A process of making thermoplastic materials which comprises polymerizing unsaturated fatty oils by heating said oils at temperatures not less than 200° C. and under sub-atmospheric pressure, simultaneously passing a current of a non-oxidizing gas through the heated oils and subsequently heating the gas-treated oil in the presence of a salt of a fatty acid.

5. A process of making thermoplastic materials which comprises polymerizing unsaturated fatty oils by heating said oils at temperatures not less than 200° C. and under sub-atmospheric pressure simultaneously passing a current of a non-oxidizing gas through the heated oils and subsequently heating the gas-treated oil in the presence of a salt of a fatty acid, and thereafter vulcanizing the polymerized oil.

6. In the manufacture of thermoplastic materials, the process which comprises heating an unsaturated fatty oil under reduced pressure, simultaneously passing a current of inert gas through the heated oil to produce a polymerized body, mixing the polymerized body with a soap and heating the mixture until, upon cooling, a thermoplastic material is obtained.

7. The process of claim 6 in which said fatty oil is linseed oil.

8. The process of claim 6 in which the fatty oil is herring oil.

9. The process of claim 6 in which said fatty oil is soya bean oil.

10. The process of claim 6 in which the said pressure is equivalent to approximately 28 inches of mercury.

11. The process of claim 6 in which the heating of the said mixture is effected under vacuum.

12. The process of claim 6 in which the said fatty oil is heated to a temperature between 200° and 300° C. under reduced pressure.

13. The process of claim 6 in which the said mixture is heated to a temperature between 240° and 260° C.

14. The process of claim 6 in which said inert gas is carbon dioxide gas.

15. The process of claim 6 in which said inert gas is sulfur dioxide gas.

16. The process of claim 6 in which said inert gas is hydrogen sulfide gas.

17. The process of claim 6 in which said soap is an alkali metal soap.

18. The process of claim 6 in which said soap is sodium stearate.

19. The process of claim 6 in which said soap is sodium dioxystearate.

20. The process of claim 6 in which said soap is an alkaline earth metal soap.

21. The process of claim 6 in which said soap is magnesium stearate.

22. The process of claim 6 in which the thermoplastic material is subsequently vulcanized.

23. In the manufacture of thermoplastic materials, the process which comprises heating linseed oil to a temperature between 250° and 330° C., under a vacuum corresponding to approximately 28 inches of mercury, simultaneously passing a current of sulfur dioxide through the heated oil to produce a polymerized body, mixing the polymerized body thus obtained with sodium stearate, heating the mixture to a temperature between 240° and 260° C. under vacuum, until, upon cooling, a thermoplastic material is obtained, said thermoplastic material being a light color, semi-transparent gel, which softens on heating and becomes semi-liquid at about 110° to 120° C. and which is capable of being subsequently vulcanized.

24. As new articles of manufacture, thermoplastic materials comprising a polymerized fatty oil and a soap, said materials being obtained by the process of claim 6.

25. As new articles of manufacture, thermoplastic materials comprising a polymerized fatty oil and soap, said materials being light colored, semi-transparent gels having an iodine value less than that of the original fatty oil, said materials first softening on heating and then on further heating becoming semi-liquid at temperatures substantially above 100° C., said materials being obtainable by the process of claim 1.

In testimony whereof, I affix my signature.

HUGH MILLS BUNBURY.